Figure 1:
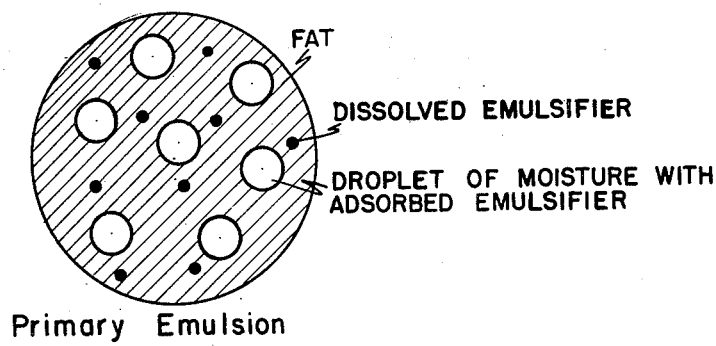

April 2, 1957  C. H. STRUBLE ET AL  2,787,550
METHOD OF MAKING AN EDIBLE OIL PREPARATION
Filed Nov. 20, 1950  2 Sheets-Sheet 1

FIG. 4.

| ESSENTIAL BASIC INGREDIENTS | TYPICAL COMPOSITION | ACTIVE TEMP. RANGE | INGREDIENT FUNCTION | INGREDIENT CLASSIFICATION | END RESULT |
|---|---|---|---|---|---|
| BAKING POWDER | 1.3% | 70° to 138°F | Expands & Lightens | Tenderizer & Dryer | Porousness & Crust Color |
| SHORTENING | 10.7% | 75° to 130°F | Emulsifies Lubricates & Lightens | Tenderizer Moistener & Enrichener | Tenderness Moistness & Volume |
| EGGS | 15.% | 140 to 160°F | Structure & Lightens | Structure Moistener & Toughener | Volume Structure & Texture |
| FLOUR | 21.5% | 122° to 180°F | Structure & Body | Toughener & Dryer | Grain, Volume Structure & Texture |
| MILK (liquid) | 20.4% | 190° to 220°F | Color & Moisture | Moistener | Moistness Crust Color & Flavor |
| SUGAR | 30.% | 80° to 250°F | Carrier, Sweetens & Lubricates | Tenderizer Moistener & Structure | Flavor, Color Moistness & Structure |
| SALT | .8% | 70° to 220°F | — | Toughener | Crust Color & Flavor |
| FLAVOR | .3% | — | — | Moistener | Flavor |

INVENTORS
CHARLES H. STRUBLE
ROBERT E. STEPHENS
BY
ATTORNEYS

April 2, 1957     C. H. STRUBLE ET AL     2,787,550

METHOD OF MAKING AN EDIBLE OIL PREPARATION

Filed Nov. 20, 1950     2 Sheets-Sheet 2

Primary Emulsion

Dispersion

Final Product

INVENTOR
CHARLES H. STRUBLE
ROBERT E. STEPHENS

BY
ATTORNEYS

United States Patent Office 2,787,550
Patented Apr. 2, 1957

2,787,550

METHOD OF MAKING AN EDIBLE OIL PREPARATION

Charles H. Struble and Robert E. Stephens, Cincinnati, Ohio, assignors to The Miami Margarine Company, Cincinnati, Ohio, a corporation Application November 20, 1950, Serial No. 196,665

2 Claims. (Cl. 99—118)

The present invention relates to method of making an edible oil preparation for use in baking and the method of making the same. This application is a continuation-in-part of application Serial No. 27,153, filed May 14, 1948, now abandoned. The edible oil preparation embodying the present invention comprises fat, moisture, and emulsifier, and, if desired, smaller proportions of milk solids, a preservative, and the like. The finished product is a multiphase plastic mass.

The principal feature of this edible oil preparation resides in the interassociation of two or more distinct fat phases and at least one moisture phase to create a structure which provides an exceptionally large interface area for the adsorption of emulsifier. This is obtained by forming a continuous oil phase in which are present fragments of finely dispersed colloidal fat particles in a continuous water phase. The interface area of this structure is exceptionally large not only because of the numerous interface areas between the continuous fat phase and the moisture phase of the fragments but also because of the numerous interface areas created between each colloidal fat particle and the moisture phase in which it is dispersed. A portion of the emulsifier is dissolved in either all the fat phase or all the moisture phase or both depending upon its solubility, and the remaining emulsifier is adsorbed at all fat-water interfaces.

An edible oil preparation having this structure is very effective because it has been found that adsorbed emulsifier has a much greater surface activity than that present within the water or oil phases in which it is soluble. Therefore, it is highly advantageous to have an enlarged interface area. This activity is greatly increased by the finely dispersed nature of the discontinuous fat phase of our preparation for the reasons which will be subsequently described.

In preparing the edible oil preparation a selected emulsifier is added to a major portion of fat which has been selected to form the continuous fat phase of the final product. Preferably, moisture is added to form a primary emulsion to increase interfacial area still further. A colloidal suspension is independently made comprising a minor proportion of "baking emulsifier" and a minor proportion of fat in moisture. The primary emulsion and colloidal suspension are then mixed together to form a secondary emulsion. This product is hardened to plastic mass consistency.

In describing the invention in more detail, the word "fat" will be used to designate any oil or fat which may be used as the shortening agent for baking purposes, including fats or fat-like substances contained in some commercial emulsifiers. The term "baking emulsifier" will be used in this application to designate any emulsifier suitable for use with shortening for baking purposes which is either water soluble, oil soluble, or both. These include such emulsifiers as the mono and diglycerides of the higher fatty acids, glyceryl monostearate, free fatty acids, and the so-called "synthetic emulsifiers." By way of example, the emulsifiers may comprise partial esters of the polyhydric alcohols and the higher fatty acids, such as the partial esters of glycerol, sorbitol, and manitol with stearic acid, and derivatives, particularly the polyoxyalkylene derivatives. Examples of specific compounds which may be used are glyceryl monostearate, glyceryl monolaurate, glyceryl mono-oleate, polyoxyethylene sorbitan monostearate, sorbitan monostearate, polyoxyethylene monostearate, and mixtures thereof. It is to be understood that these examples are not to be considered as limitative, for the concept of the invention embraces the use of any "baking emulsifier" for its prescribed purpose as an emulsifier, as the invention resides in the arrangement of the emulsifier within its carrier or vehicle within the correct proportion to attain maximum availability and efficiency.

The moisture component may comprise water, whole milk, skim milk, cream, and a combination of water and dried skim milk powders or mixtures of these ingredients in any proportions with traces of other ingredients such as flavoring or color as will be subsequently discussed.

The preparation of an edible oil preparation embodying the present invention will now be described in detail, it being understood that various substitutes may be made by those skilled in the art without departing from the spirit of the invention.

As previously emphasized, the present invention resides in the structure of the edible oil preparation and not in the specific percentages of the ingredients. It would be impractical to give the operable percent ranges of the ingredients which could be used in this edible oil preparation because they vary widely depending upon the type of fat and emulsifier selected and upon the specific use to which the edible oil preparation is to be placed. These factors give rise to great variations in the percentages of the ingredients which can or should be used as illustrated in the following chart relating to percentage ranges when glyceryl monostearate is used.

EXAMPLES OF PERCENTAGE RANGE

|  | Percent | | | | |
| --- | --- | --- | --- | --- | --- |
| Dispersion: | | | | | |
| Water | 13 | 18 | 15 | 17 | 4.2 |
| Glyceryl Monostearate | 7 | 6 | 5 | 3 | .7 |
| Fat or Stearine Flakes | 3 | ¹ 0 | 1 | 3 | .7 |
| Primary Emulsion: | | | | | |
| Oil | 69 | 72 | 71 | 69 | 84.5 |
| Glyceryl Monostearate | 3 | 2 | 3 | 3 | 3.7 |
| Water | 5 | 2 | 5 | 5 | 6.2 |

¹ Fat supplied by triglycerides of Commercial G. M. S.

The percentages given above would vary even more greatly where the type of emulsifier is varied. It should be remembered that the use of unusual proportions requires careful control to obtain the desired structure and to prevent phase reversal either during the preparation or during baking.

The primary emulsion

The independently prepared portion which forms the continuous fat phase of the final product may comprise a dominant proportion of fat and a minor portion of emulsifier dissolved or mixed therein, depending upon its solubility. Preferably, however, moisture is added to form an emulsion. As an example, a hydrogenated vegetable oil may be used and glyceryl monostearate may be selected as the emulsifier. The amount of fat employed is determined by practical considerations such as the total amount of fat desired in the preparation for a particular bakery use, coupled with the requirement that sufficient fat be present to prevent phase reversal in the preparation. As a result, the fat component in the primary emulsion probably will be within a range of from 60% to 70% based on the weight of the finished product. The moisture component may comprise as much as 5% based on the weight of the finished product when a high percentage of fat based on the weight of the finished product is used.

Present experiments indicate that an emulsifier in an amount of approximately 3% based on the weight of the finished product is effective. This amount may be increased, the only limit being a practical consideration of economy, for as larger amounts are added, the effective emulsifying properties of the excess emulsifier are diminished to a point where the excess emulsifier serves merely as a relatively inactive component. The point at which maximum depreciation of effectiveness is reached will, of course, vary with the particular "baking emulsifier" used. Also, the lower limit of total emlsifier component in the preparation will be effected by the degree of emulsification desired in a bakery product. As low as 1% total emulsifier based on the weight of the finished product may be adequate, and the principles of the invention are fully applicable for use of reduced amounts of emulsifier.

The essential consideration is the use of sufficient emulsifier to obtain the desired structure in the preparation so that it will be active throughout the entire baking process. It will be appreciated that as the fat, moisture, and/or emulsifier content is varied, the remaining ingredient proportions must be correspondingly adjusted to make up the whole.

In making the primary emulsion, when oil soluble emulsifier or one soluble in both oil and water is to be used, the fat and emulsifier must be liquid in order to dissolve the emulsifier in the fat. This may require heating of either the fat or emulsifier or both. The emulsifier is then added and dissolved in the oil. At this point it may be desirable to cool the solution somewhat before adding the moisture component. However, the solution must be warm enough to keep the fat in a liquid state. The moisture component is then added with sufficient agitation to form and maintain an emulsion.

In making a primary emulsion when a water soluble emulsifier is used, it preferably is mixed into the liquefied fat but can be dissolved in the moisture. In the latter event, the moisture is heated to a point at which the emulsifier is most soluble. The emulsifier is then added and dissolved in the water. To this solution is added the melted fat component with sufficient agitation to form an emulsion.

The dispersion

The dispersion is a colloidal suspension which may or may not be in a state of gelation depending upon the nature of the emulsifying material used, but which maintains its structural identity when subsequently mixed with the primary emulsion.

The dispersion or colloidal suspension component of the preparation comprises a larger proportion of a moisture component in the continuous phase and a minor proportion of fat with adsorbed emulsifier in a finely dispersed phase. The proportion of these components used in forming the dispersion depends primarily upon attaining a desired degree of structural stability, and upon the proportions of moisture, fat, and emulsifier desired in the finished product.

The mode of incorporation and the location of the emulsifier will depend upon whether the emulsifier is fat soluble or water soluble or both. Preferably, the emulsifier is added to the liquefied fat. For example, in the case of a fat soluble emulsifier such as glyceryl monostearate the emulsifier must be dissolved in the fat phase and in the case of a water soluble emulsifier such as polyoxyethylene sorbitan monostearate it is preferably mixed in the liquefied fat component of the dispersion. However, the water soluble emulsifiers may be dissolved in the moisture phase. In the case of a fat-like or oleaginous emulsifier such as commercial glyceryl monostearate it is possible to consider the emulsifier itself as the fat and additional fat can be deleted, although for structural consideration we have found it to be advantageous to add more fat even in this case. In other types of emulsifiers it is, of course, necessary to have the additional fat phase present in the dispersion in order to carry out our structural concept.

The amount and type of fat preferred in this dispersion will depend upon the performance obtained through the use of a given fat and upon the baking temperature range of the particular product in which the edible oil preparation is to be used in which emulsifying action is required. For this reason, the colloidal suspension may contain the following:

I. Hard fat, "baking emulsifier," and a larger proportion of moisture. This is a preferred composition for the suspension, because it will provide emulsifying action over a higher baking temperature range.

II. Minor proportions of fat and "baking emulsifier" in a larger proportion of moisture in which the fat consists of a solution of hard fat and fat or fats of lower melting point. This will provide emulsifying action over a lower baking temperature range.

III. Minor proportions of fat and "baking emulsifier" and a larger proportion of moisture in which the fat is a lower melting fat or fats.

IV. Minor proportions of a "baking emulsifier" in a larger proportion of moisture without added fat. The emulsifier in this case must have a fat-like or oleaginous structure to obtain the multiphase structure.

The proportions of components in the dispersion may be further modified by the consideration of the properties desired in the bakery product from the standpoint of emulsification, for it will be appreciated that if a minor portion of emulsifier is desired for the particular bakery product being manufactured, this may be accomplished either by adding a smaller amount of the preparation to the batter whereby the proportion of oil and water added will also simultaneously be decreased, or by decreasing the amount of emulsifier added to the preparation, whereby the proportion of water and fat will remain constant with only variation occurring in the amount of emulsifier added.

For purposes of description, an operable proportion of ingredients may comprise 15% moisture, about 4% stearine flakes, and about 5% emulsifier based upon the weight of the finished product. The proportion of added fatty material constituent may be increased or decreased without modification of the emulsifier and water proportions so long as structural stability is maintained within the dispersion.

It is preferred to use stearine flakes as the fatty constituent in the dispersion. It also has been found that when fat soluble emulsifiers are used, a better and more stable dispersion is formed when the emulsifier and fatty constituents are melted together to form a solution. This solution is then added with sufficient agitation to the water which has been heated to a temperature above the melting point of the solution. The suspension is then cooled.

Preferably, in the case of water soluble emulsifiers, the hot liquid fat and emulsifier are mixed together. This mixture is added to the hot water with necessary agitation and cooled.

The secondary emulsion

The dispersion is then added to the primary emulsion with sufficient agitation and at a temperature above the melting point of the mixed constituents of the primary emulsion but below the temperature at which the dispersion loses stability. Ordinarily, it will be necessary to cool the primary emulsion and the dispersion before they are mixed together to attain the desired mixing temperature. This secondary emulsion is then solidified to form the preparation of the invention in accordance with conventional plasticizing procedures, with or without a blending operation to ensure uniformity of product. At some point during the plasticizing process a non-toxic and relatively inert gas may be injected in order to lighten the product or for some other purposes.

The finished product

Figure 2:
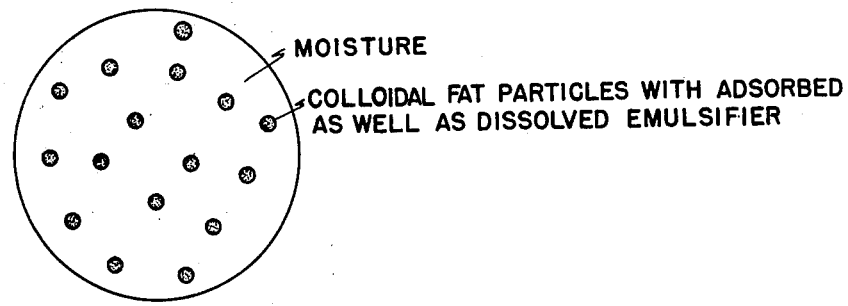
Figure 3:
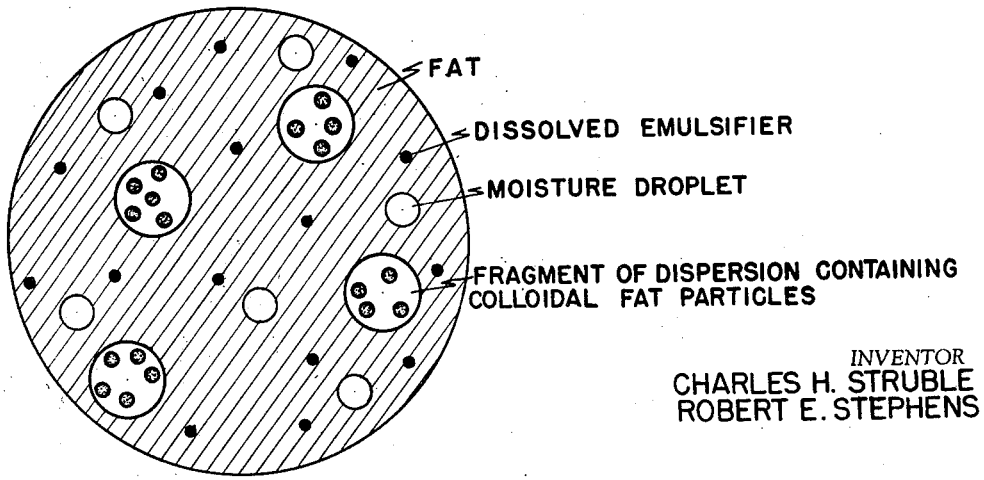

As previously emphasized, the essence of the invention resides in the structure of the finished product. The structure of the primary emulsion, the dispersion, and the final product when an oil soluble emulsifier is used is shown in Figures 1, 2 and 3 of the drawings for purposes of illustration. If an emulsifier which is only soluble in water is selected, the structure would be the same except the emulsifier would be dissolved in the moisture phase and possibly some would be mixed in the continuous fat phase.

The primary emulsion comprises a continuous fat phase in which are present droplets of moisture. A portion of the added emulsifier is dissolved in the fat phase. In addition, a portion of the emulsifier is adsorbed and oriented at the water-fat interfaces.

The dispersion consists of colloidal fat particles dispersed throughout the moisture phase. A portion of the emulsifier is dissolved in the fat and the remainder is adsorbed and oriented at the water-fat interfaces. The colloidal particles of fat are held in suspension in the water phase by adsorption effects between the oriented emulsifier surfaces and the surrounding moisture. They also provide a bulk or volume factor which provides free orientation of the emulsifier at the interface area, especially when the fat is liquid.

The structure of the final product is shown in Figure 3 of the drawings. This product comprises a continuous fat phase containing dissolved emulsifier, droplets of moisture, and fragments of the added dispersion which consist of a continuous moisture phase in which is dispersed the colloidal fat particles which have been previously described in connection with the structure of the dispersion.

This structure is entirely different from the conventional emulsifier shortening of either the "dry" or "wet" type which does not provide colloidal fat particles in a continuous moisture phase within a continuous fat phase. The presence of this feature is highly advantageous for the reasons which will now be discussed.

It is obvious that this structure greatly increases the fat-water interface area because interfaces are formed by each fragment of the dispersion between its water phase and the continuous fat phase. In addition, interface areas are formed by each colloidal fat particle with the moisture phase in which it is dispersed. It has been found that the adsorbed emulsifier in these interface areas has a much greater emulsifying action than that present within the moisture or continuous fat phase.

The presence of the dispersion fragments is also highly advantageous because all desirable emulsifiers have hydrophilic as well as lipophilic characteristics. For this reason, the adsorbed emulsifier on the colloidal fat particles and the emulsifier in the part of the continuous fat phase adjacent to the moisture surrounding the colloidal fat particles will have a tendency to orient themselves in such a manner that their polar ends will be directed towards the moisture so that the polar ends reside in the moisture. If the film of moisture in that region is thin enough, this will result in the polar ends of adjacent molecules of emulsifier in the continuous fat phase and in the colloidal fat particles forming a continuous bond with the moisture from interface to interface.

These features give rise to a number of improved functions in the finished preparation which include the following:

1. Improved initial water adsorption which insures a drier batter.
2. More highly effective emulsification of the fats in the batter in the mixing stage.
3. A wetting action on the starches and proteins in the batter.
4. A stabilizing action due to adsorption effects during baking.
5. A final emulsifying action and dispersing action on fats during baking.
6. A final water adsorption action to control loss of water during baking and during storage of the finished bakery product.

The structure in our edible oil preparation also makes the use of sharper melting fats possible. It is well known that sharper melting fats produce more tender and finer grained cakes, but the action of these fats is relatively unpredictable and uncontrollable in ordinary emulsifier shortenings. Usually, the use of these fats is avoided by using a fat of wide plastic range or by dissolving or blending higher melting fat fractions such as glyceryl tristearine into the fat. Since in our preparation distinct and separate fat phases are present, we can use a sharp melting continuous fat phase containing emulsifier with an added finely water dispersed higher melting fat containing emulsifier to control and stabilize the action of the sharp melting fat phase. In a static physical sense, the sharp melting fat phase can act independently as a shortening while the presence of the second phase along with its adsorbed emulsifier and moisture film controls its action. This advantage of separate phases makes possible the use of fats or blends of fats in the continuous phase which might be avoided in conventional shortening because of their effect on the overall action.

Preferably, any edible oil or fat or mixture thereof capable of liquefaction within ordinary temperatures, preferably vegetable oils and fats or blends having a "Wiley" melting point of from 30° C. to 40° C., can be used. These include soya bean oil, cottonseed oil, and cocoanut oil. Other edible oils such as fish oil, whale oil, rapeseed oil, or blends of these oils or similar oils may be used.

Action in a batter

The making of a good cake involves a very complex series of physical and chemical changes which must take place at the proper time and in the proper sequence. It is very much like a relay race in which each ingredient must perform its function at the proper time as well as in an effective manner.

The basic ingredients used in the usual layer or loaf cake containing shortening are shown in Figure 4 of the drawings. It will be noted that each of these ingredients functions over a definite temperature range which, of course, frequently overlap. For example, the baking powder functions as a leavening agent by reacting with water within a given temperature range to form carbon dioxide. Usually, this reaction is complete when the batter reaches a temperature of 138° F. Therefore, the baking powder is active as a leavening agent only during the early stages of the baking process. The baking powder and salt also are effective in crust color by lowering the carmelization point of the sugars. In a like manner, the remaining ingredients play their part at the proper time to produce a desirable product.

The function of a fatty shortening in which is incorporated the emulsifier is especially important in producing the desired result. The fat has the property of entrapping and holding air. During the batter mixing operation, tiny air cells are formed in the fat, and as the fat is dispersed in the batter, the air cells are carried along with the fat. These air cells are the nuclei for the expansion points which eventually develop the cellular structure which may be seen in the finished cake. Hence, a coarse dispersion of the fat will produce a coarse textured cake while a more finely dispersed fat will promote a finer cellular structure in the finished cake.

The structure of a finished cake in which our edible oil preparation has been used will indicate that a very fine dispersion of the fat can be obtained through the use of the preparation. Microscopic examination of a prepared and mixed batter will also show that an extra fine dispersion of the fat and air cells can be obtained. Only standard ingredients, proportions, and methods need be used except that our preparation should replace the conventional fatty shortening in the preparation of the test cake or batter.

In a test batter (before baking) it will be noticed that the batter will be drier even though a higher standard proportion of water is used in the batter. This indicates a greater initial adsorption of water in the batter. This action may be due to the increased water adsorption by our preparation or by more effective adsorption of water by the starches due to a wetting action by our preparation. The total effect is probably due to both functions.

During the lower temperature ranges of baking the starches continue to absorb water. The wheat proteins are hydrated to gluten which tends to be adsorbed at the interfaces of the fat globules and the continuous water phase. The fat melts and is absorbed into the mass of the cake; at this point the glutenous films around the fat globules should be of such a strength, elasticity, and structure that they should hold the gases and vapor in the cells which were formerly made up of fat globules.

The action of our preparation in this phase of baking evidently is of the same general nature as that of a conventional shortening except for some important modifications. It is believed that the colloidal fat particles which make up the colloidal dispersion in the preparation have a tendency to adsorb to the surface of the fat globules in the mixed batter. This adsorption acts through a film of water which adheres both to the surface of the fat globules which contains adsorbed emulsifier and to the surface of the colloidal fat particles which also contains adsorbed and oriented emulsifier molecules. If the colloidal particles of fat are in close enough proximity to the surface of the fat globule, the associated bonds will traverse continuously or nearly continuously from the polar ends of the emulsifier molecules on one surface to the polar ends of emulsifier on the other surface. The adhesive bond thus formed is relatively strong. The adsorption of gluten at the fat-water interface and adhesive bonding of the same to that interface evidently is due to an action similar to that in the case of colloidal fat particles since the gluten is hydrophilic in nature.

Since the surface composition of the colloidal fat particles and that of the fat globules, i. e., a composition consisting of a surface concentration of oriented and adsorbed emulsifier molecules, is more nearly the same, affinity for adhesion is probably greater than that between these surfaces and the surfaces of the gluten particles. In like manner, the adhesive forces which bind the gluten particles to each other are probably greater than those which bind the gluten particles to the fat surface.

The result of these effects is that the colloidal fat particles tend to impart rigidity and strength to the surface of the fat globules and the gluten particles tend to be joined to each other by adsorption effects.

Although there should be interaction between all these surfaces the tendency is for the gluten to form a continuous film around the fat whereas the colloidal fat has a tendency to adhere more directly to the surface of the fat globules thus imparting strength and elasticity to the surface. The improved surface properties imparted in this way should be exerted up through increasing temperatures to the point where the colloidal fat melts.

Accordingly, if the colloidal fat has the proper melting point, that is, high enough so that the gluten may be able to form a gas tight film around the fat globules, the surface of the fat globule will be stabilized even though the fat in that globule has melted at a considerably lower temperature. This will allow the globule to hold its air to a temperature where the gluten film may be more capable of holding the air and other gases and vapors.

That this action or something like it occurs is borne out by the fact that when a higher melting fat such as stearine is used in the colloidal fat phase of our preparation better cakes are obtained.

It must be realized that the bonding forces throughout a cake batter are primarily exerted through films of water, hence the starch, gluten, and other proteins in particle form are separated by these films through which the adhesive forces exert themselves. When all the fat of our preparation melts, it is necessary that it be absorbed into the mass of the cake instead of mutually coalescing into relatively large fat globules.

As all the fat of our preparation contains emulsifier and thus after melting will develop a low interfacial tension with water, it is capable of passing through the interstices between the particles of other hydrophilic substances in the batter with a minimum of disruptive action. It is possible that fat which has a good concentration of emulsifier at its interfacial areas will when in a liquid state be drawn into the mass of the batter by an action related to capillary action.

This phenomenon can be illustrated by baking a small amount of prepared batter between microscope slides and observing the action under a microscope. The fat is seen to disappear into the mass of the batter when conditions are right. The fat so dispersed into the batter serves to lubricate the batter and the more uniform the dispersion the more even such a lubrication will be.

It is believed that to obtain more effective dispersion of the fat in this period of baking that both fat phases should have its own emulsifier available. The colloidal fat will have previously acquired its film of water due to the action of the emulsifier directly adsorbed to its own surface. If the main phase of fat has no emulsifier available at this stage, it is not likely to acquire any from the colloidal fat when that phase melts because the low interfacial tension of the colloidal fat will tend to keep it in its dispersed state and its acquired surface films of water will interfere with its joining the main fat phase. Therefore, the main fat phase must have its own emulsifier in intimate contact in order to promote its own dispersion. It is not to be inferred that if the main fat phase does not contain emulsifier that the colloidal fat will not help to promote the dispersion of the main phase; the colloidal fat probably does help to disperse the main fat phase, but if the main fat phase has its own emulsifier the action should be more certain and effective.

After the cake is finished, a good dispersion of all the fat present with its adsorbed emulsifier and water films should tend to hold the water present for a longer period of time than would otherwise be possible. Also, since more water can be used in making batters with our preparation, a high level of moisture can be maintained in the cake for longer periods after baking.

The foregoing discussion was presented to illustrate the action of our preparation in a cake batter. Although we believe the action follows the general pattern suggested here and the results observed in preparation of a batter and in the finished cake seem to indicate that something like this action takes place. This discussion is not meant to limit the scope of our invention in any way in that the discussion was presented for illustration only. However, it would account for the definite superiority of our multiphase preparation over the usual emulsifier containing shortening.

The following formulae of edible oil preparation embodying the present invention are given by way of illustration only, it being understood that the specific ingredients and proportions will vary in accordance with the requirements of the particular product for which the edible oil preparation is to be used.

EXAMPLE 1

| Ingredients of primary emulsion: | Percent |
|---|---|
| Refined, bleached, and hydrogenated oil | 68 |
| Glyceryl monostearate (commercial) | 3 |
| Water | 5 |
| Ingredients of colloidal suspension: | |
| Water | 15 |
| Stearine flakes | 4 |
| Glyceryl monostearate (commercial) | 5 |
| Mold inhibitor | trace |

Combine emulsion and suspension and then plasticize.

EXAMPLE 2

| Ingredients of primary emulsion: | Percent |
|---|---|
| Refined, bleached, and hydrogenated oil | 68 |
| Glyceryl monostearate (commercial) | 3 |
| Water | 5 |
| Ingredients of colloidal suspension: | |
| Water | 15 |
| Stearine flakes | 2 |
| Glyceryl monostearate (commercial) | 5 |
| Refined, bleached, and hydrogenated oil | 2 |
| Mold inhibitor | trace |

Combine emulsion and suspension and then plasticize.

EXAMPLE 3

| Ingredients of primary emulsion: | Percent |
|---|---|
| Refined, bleached, and hydrogenated oil | 68 |
| Glyceryl monostearate (commercial) | 3 |
| Water | 5 |
| Ingredients of colloidal suspension: | |
| Water | 15 |
| Refined, bleached, and hydrogenated oil | 4 |
| Glyceryl monostearate (commercial) | 5 |
| Mold inhibitor | trace |

Combine emulsion and suspension and then plasticize.

EXAMPLE 4

| Ingredients of primary emulsion: | Percent |
|---|---|
| Refined, bleached, and hydrogenated oil | 72 |
| Glyceryl monostearate (commercial) | 3 |
| Water | 5 |
| Ingredients of colloidal suspension: | |
| Water | 15 |
| Glyceryl monostearate (commercial) | 5 |
| Mold inhibitor | trace |

Combine emulsion and suspension and then plasticize.

EXAMPLE 5

| Ingredients of primary emulsion: | Percent |
|---|---|
| Refined, bleached, and hydrogenated oil | 76.8 |
| Polyoxyethylene sorbitan monostearate (Tween 60) | 1.0 |
| Water | 17.0 |
| Ingredients of colloidal suspension: | |
| Water | 3 |
| Stearine flakes | 1.2 |
| Polyoxyethylene sorbitan monostearate (Tween 60) | 1.0 |
| Mold inhibitor | trace |

Combine emulsion and suspension and then plasticize.

It is contemplated that the preparation of the invention may be employed in the form described herein without further modification. In some instances, however, it may be desirable to add further components. For example, it may be desirable to add salt for flavor and preservative purposes. It may be desirable to substitute a part or the whole of the moisture constituent with skim milk, or to add milk solids to the mixture, for purposes of fortifying the preparation with milk sugars or protein. Various flavoring extracts may be added as desired.

The preparation of the invention is employed advantageously as a bakery additive for general baking purposes. The preparation may be used by itself or in combination with a conventional shortening to assist in proper development of the batter such as in cake manufacture. In either event, the efficiency of the shortening and other ingredients is increased. Moreover, bakery products made with the preparation of the invention are characterized by more uniformity, finer texture and tenderness, and retain their freshness longer than cakes prepared with conventional fats containing emulsifiers.

While the invention has been described with reference to the specific embodiments set forth, it is not to be regarded as limited thereby save as defined in the appended claims.

We claim:

1. A method of making a multiphase edible oil preparation comprising mixing a fat, moisture, and a baking emulsifier at a temperature above the melting points of the fat and emulsifier to form an emulsion having the emulsifier adsorb at the moisture-fat interface and the baking emulsifier in solution throughout the continuous fat phase, separately mixing fat, moisture, and an emulsifier to form a colloidal dispersion of hard fat particles in a continuous moisture phase with emulsifier adsorbed at the interface of the fat particles and moisture, mixing the colloidal dispersion and the emulsion together at a temperature above the melting point of the continuous fat phase of the emulsion and below the melting point of the hard fat particles whereby the dispersion remains stable and a multiphase edible oil preparation is formed.

2. A method of making a multiphase edible oil preparation comprising mixing a fat, moisture, and a baking emulsifier at a temperature above the melting points of the fat and emulsifier to form an emulsion having the emulsifier adsorb at the moisture-fat interface and the baking emulsifier in solution throughout the continuous fat phase, separately mixing fat, moisture, and an emulsifier to form a colloidal dispersion of hard fat particles in a continuous moisture phase with emulsifier adsorbed at the interface of the fat particles and moisture, mixing the colloidal dispersion and the emulsion together at a temperature above the melting point of the continuous fat phase and below the melting point of the hard fat particles whereby the dispersion remains stable and a multiphase edible oil preparation is formed, said colloidal dispersion constituting approximately 5 to 25% of the total composition.

References Cited in the file of this patent

UNITED STATES PATENTS

| 2,006,798 | Epstein et al. | July 2, 1935 |
| 2,062,782 | Epstein et al. | Dec. 1, 1936 |
| 2,132,393 | Coith et al. | Oct. 11, 1938 |
| 2,217,309 | Epstein et al. | Oct. 8, 1940 |
| 2,379,294 | Gooding | June 26, 1945 |
| 2,422,486 | Johnston | June 17, 1947 |
| 2,575,874 | Herlow | Nov. 20, 1951 |